United States Patent
Lai

(10) Patent No.: US 6,881,924 B2
(45) Date of Patent: Apr. 19, 2005

(54) STRUCTURE OF PLATFORM AND AIR-COLLECTING BIN IN A LASER-CUTTING/ENGRAVING MACHINE

(75) Inventor: Jin-Sheng Lai, Hsi Chih (TW)

(73) Assignee: Great Computer Corp. (TW)

( * ) Notice: Subject to any disclaimer, the term of this patent is extended or adjusted under 35 U.S.C. 154(b) by 82 days.

(21) Appl. No.: 10/621,332

(22) Filed: Jul. 18, 2003

(65) Prior Publication Data

US 2005/0011874 A1 Jan. 20, 2005

(51) Int. Cl.[7] .......................... B23K 26/14; B23K 26/16
(52) U.S. Cl. .............................. 219/121.67; 219/121.68
(58) Field of Search ...................... 219/121.67, 121.68, 219/121.69, 121.73, 121.82, 121.84, 121.86

(56) References Cited

U.S. PATENT DOCUMENTS

| | | | | |
|---|---|---|---|---|
| 4,985,780 A | * | 1/1991 | Garnier et al. ......... | 219/121.68 |
| 5,906,760 A | * | 5/1999 | Robb et al. ............. | 219/121.67 |
| 6,388,228 B1 | * | 5/2002 | Lai ......................... | 219/121.6 |
| 2003/0066574 A1 | * | 4/2003 | Lovchik et al. ............ | 144/382 |
| 2004/0040943 A1 | * | 3/2004 | Lundberg ............... | 219/121.68 |

\* cited by examiner

*Primary Examiner*—M. Alexandra Elve
(74) *Attorney, Agent, or Firm*—Dennison, Schultz, Dougherty & MacDonald

(57) ABSTRACT

In a laser-cutting/carving machine, a structure of a platform and an air-collecting bin, wherein the machine body is provided therein with a laser-carving mechanism, the platform for a work piece and the air-collecting bin, the platform for the work piece is composed of a plurality of upright folded thin plates, and can contact with the work piece in a net-line contacting mode to enhance removing crumbs and smoke as well as fixing the work piece and fast heat sinking by air pressure acting downwards from above. The air-collecting bin can be opened downwardly or closed for the convenience of collecting the dropped materials of the work piece processed and clearing the wastes and crumbs generated in processing.

5 Claims, 6 Drawing Sheets

STRUCTURE OF PLATFORM AND AIR-COLLECTING BIN IN A LASER-CUTTING/ENGRAVING MACHINE

BACKGROUND OF THE INVENTION

1. Field of the Invention

The present invention is related to a structure of a platform and an air-collecting bin in a laser-cutting/engraving machine, and especially to such a structure capable of getting excellent effects of removing crumbs, discharging smoke, fixing a work piece as well as heat sinking, and convenient in collecting the dropped material processed and in clearing the wastes and crumbs generated in processing; the structure is suitable for applying on various structures such as laser engraving machines or the like for cutting or engraving cloths or leathers.

2. Description of the Prior Art

Since laser-cutting/engraving machines of high qualities are widely used, by virtue that they are fast in cutting and convenient in cutting into shapes, various laser-cutting/engraving machines specific for cloths and leathers have been developed; removing heat and cutting crumbs generated in laser processing and particularly generated in processing cloths and leathers of low ignition points being subject to combusting because of heat from cutting able to damage work pieces or even to induce fire alarms thereby is highly thought about in the art and by the users.

However, most conventional laser-cutting/engraving machines use on each of them a plane plate as a platform for placing thereon a work piece, it is unable to immediately remove the large amount of heat generated in cutting; and when they are used to cut cloths and leathers subject to combusting, the large amount of heat generated in cutting makes ignition of the crumbs to burn the work piece or even to induce a fire alarm, thereby the laser-cutting/engraving machines get higher danger when in cutting the materials of cloths or leathers, and are not ideal machines.

Referring to FIG. 1, when it is desired to smoothly remove the crumbs in cutting the materials such as cloths or leathers, the platform of a conventional laser-cutting/engraving machine is added with a spreading cloth provided with a lot of needles in order that the surfaces of a work piece and the cloth provided with the needles can make point contact, so that the crumbs generated in cutting can drop to the bottom of the spreading cloth, thereby, combustion because of large amount of heat from cutting can be prevented. However, although the crumbs generated in cutting can drop to the bottom of the cloth, the effect of such dropping is not good, this is because that cloths and leathers are lighter, the crumbs of them can not be completely removed from the work piece just by the force of gravity; and cutting of laser will also pierce the work piece to result cutting traces on the cloth with the needles, the cloth will be damaged and need changing after use for a long period, this may increase the cost of material; further by virtue that in spreading the cloth with the needles, the corners of the cloth will be curved upwardly because of changing of temperature and humidity to make unevenness of the surface of the work piece and to affect the accuracy of engraving or cutting, thereby the conventional laser-cutting/engraving machine is not an ideal machine.

In view of the above stated, the inventor of the present invention studied hard to design and develop the present invention based on the consideration of safety in operation of a laser-cutting/engraving machine and of making fast removing crumbs and heat sinking in cutting cloths and leathers.

SUMMARY OF THE INVENTION

The primary object of the present invention is to provide a structure of a platform and an air-collecting bin in a laser-cutting/engraving machine, with which the contact surfaces of the platform and a work piece are contacted with each other in a net-line contacting mode, thereby the crumbs and smoke generated in laser processing can be discharged from an air-collecting bin and out of an air outlet on the rear side of the air-collecting bin to endue the structure with an effect of removing crumbs and fixing the work piece.

Another object of the present invention is to provide a structure of a platform and an air-collecting bin in a laser-cutting/engraving machine with which to fix a piece of cloth and leather by air pressure, heat and cutting crumbs can be fast removed to effectively reduce the temperature generated in cutting, thereby combustion of the cloth and leather can be prevented.

Another object of the present invention is to provide a structure of a platform and an air-collecting bin in a laser-cutting/engraving machine, with which by providing a platform integrally formed of metal, the platform can be repeatedly used, thereby cost of cutting and engraving can be reduced.

To get the above objects, in the structure of a platform and an air-collecting bin in a laser-cutting/engraving machine of the present invention, a panel and a bottom base are mutually abutted on and connected to form the body of the machine, the machine body is provided therein with a laser-engraving mechanism, a platform for a work piece and an air-collecting bin; wherein the air-collecting bin is placed beneath, abutted on and connected to the platform, the laser-engraving mechanism is provided on the platform, the machine body is provided with a movable door for the air-collecting bin. The structure is characterized by that: the platform for the work piece is composed of a plurality of upright folded thin plates forming a board with a large area and having forming therebetween a plurality of holes, so that the work piece can be placed on the platform contacting with the latter in a net-line contacting mode to enhance removing crumbs and fixing the work piece. The air-collecting bin is in the form of a trapezoid box, it is provided on a rear side thereof with an air outlet, pivotally connecting members are provided above the outlet on this side to pivotally connect the platform; and it is provided on another side thereof with a locking mechanism in opposition to the platform. The air-collecting bin can be opened downwardly or closed for the convenience of collecting the dropped material processed and clearing the wastes and crumbs generated in processing.

The present invention will be apparent in its features and structure after reading the detailed description of the preferred embodiment thereof in reference to the accompanying drawings.

DETAILED DESCRIPTION OF THE PREFERRED EMBODIMENT

Figure 1:
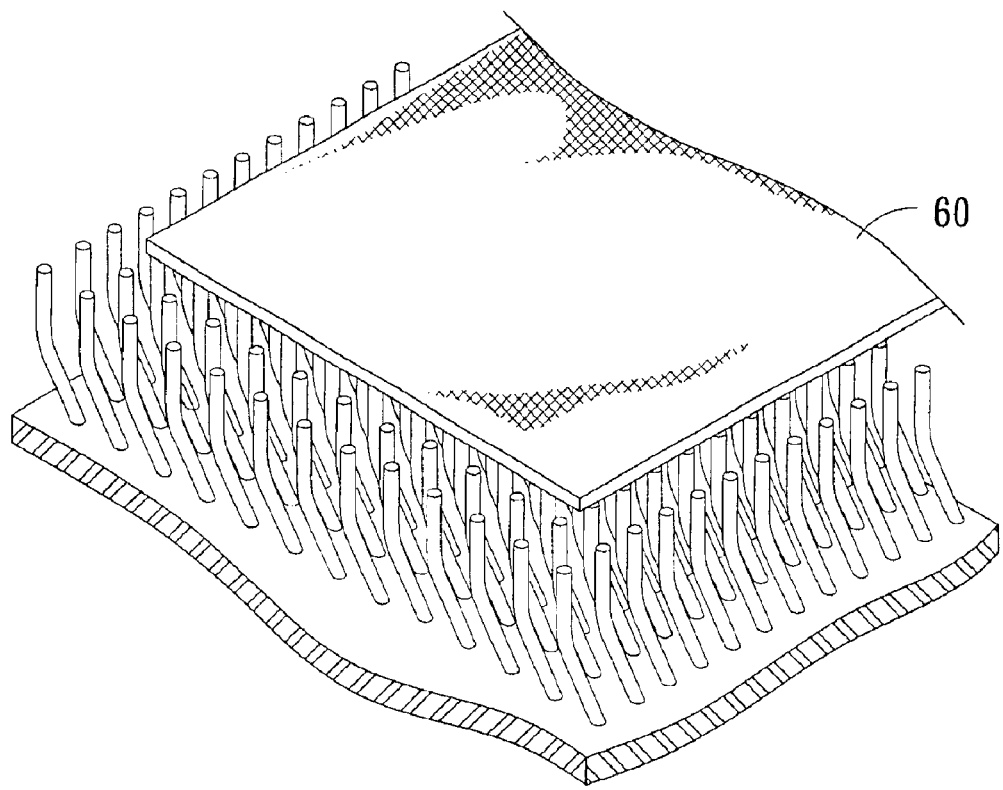
FIG. 1 is a schematic perspective view of a piece of cloth provided with needles of a conventional structure.
Figure 2:
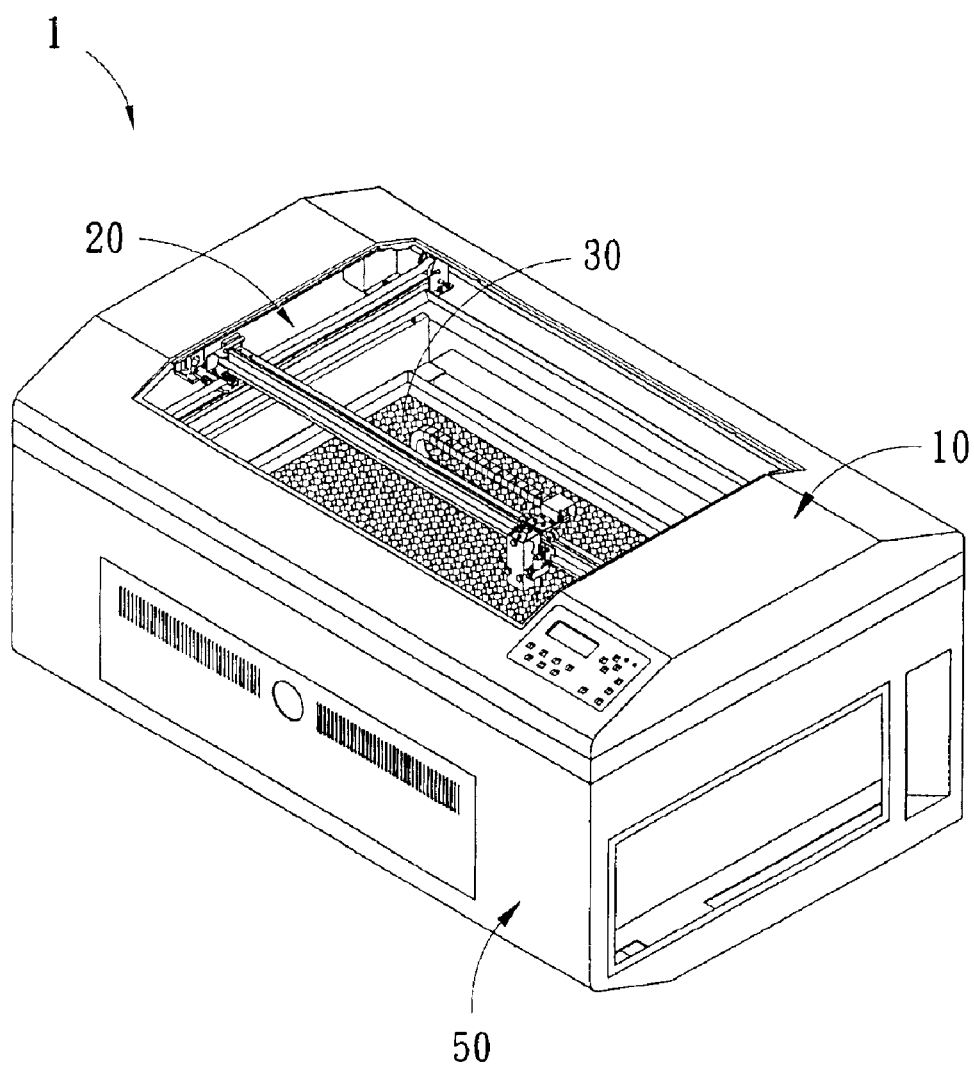
FIG. 2 is a perspective view showing the appearance of an embodiment of the present invention.
Figure 3:
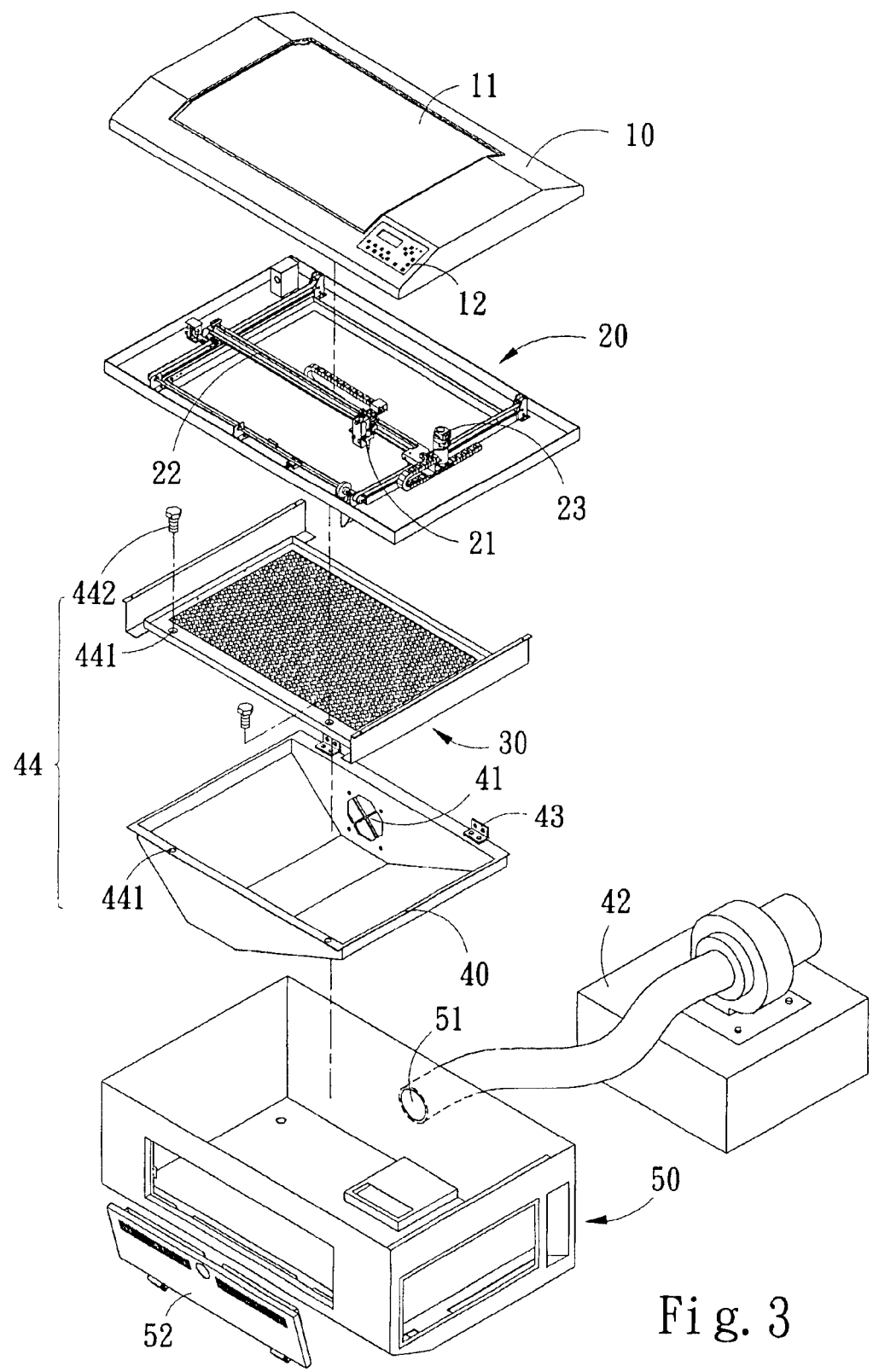
FIG. 3 is an analytic perspective view showing the elements of the embodiment of the present invention.
Figure 4:
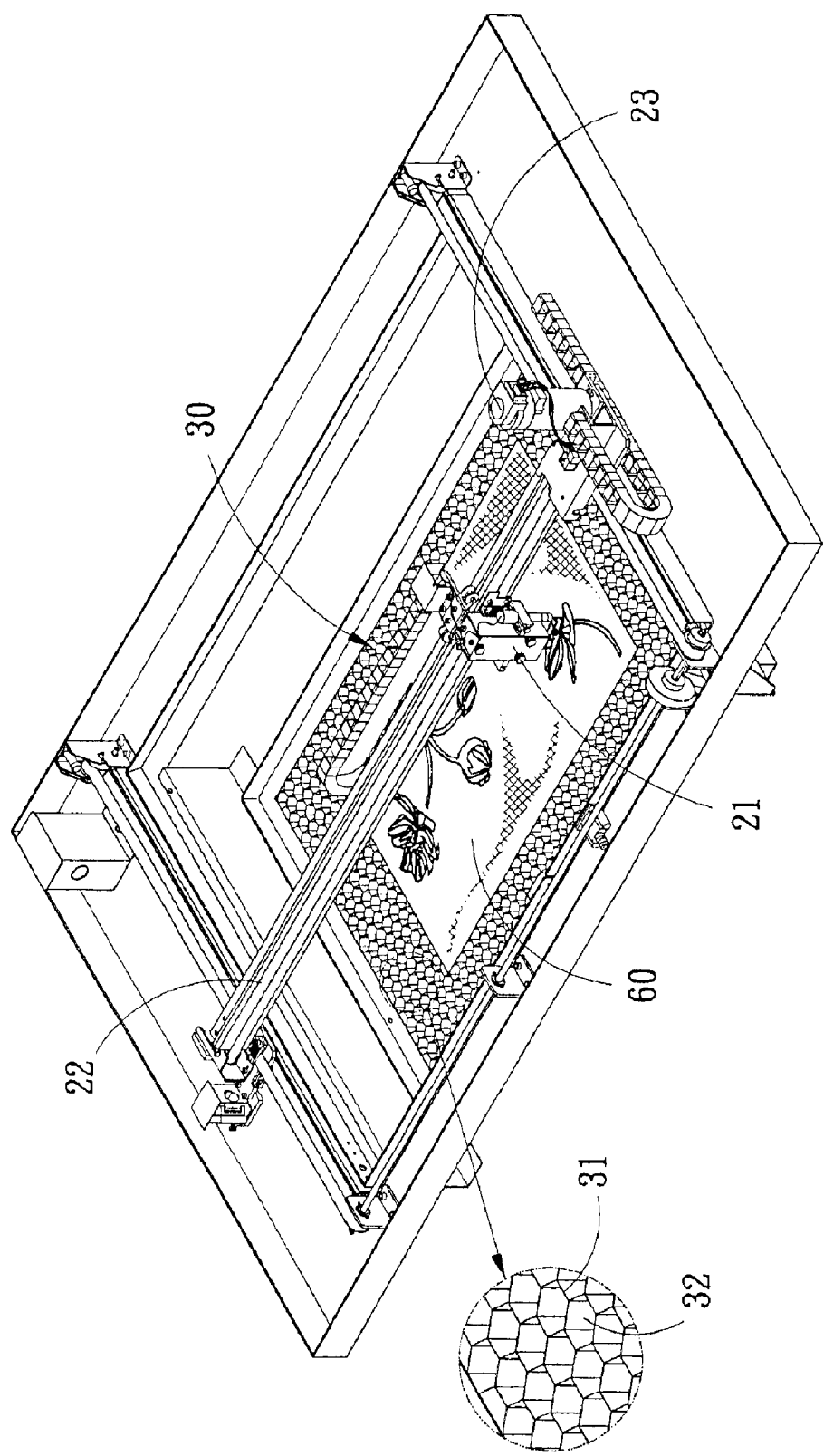
FIG. 4 is a perspective view showing the appearance of a platform for a work piece of the embodiment of the present invention.

Referring firstly to FIGS. 2–4 showing the structure of a platform and an air-collecting bin in a laser-cutting/engraving machine of the present invention, it comprises a panel 10 and a base 50 mutually abutted on and connected to form the body 1 of the machine, the machine body 1 is provided therein with a laser-engraving mechanism 20, a platform 30 for a work piece 60 and an air-collecting bin 40. Wherein the panel 10 is combined with a computer control device 12, and has thereon a transparent liftable lid 11;

- the laser-engraving mechanism 20 is provided with a pen carriage 21 mounted on a slide rail 22, and is connected with a laser device thereabove to generate laser beam for cutting or engraving; a transmitting device 23 is provided here for controlling displacing of the pen carriage 21 mounted on the slide rail 22 to a desired position;
- the platform 30 is composed of a plurality of upright folded metallic thin-plates 31 forming a board with a large area, the folded metallic thin-plates 31 therebetween form a plurality of holes 32, so that the work piece 60 can be placed on the platform 30 contacting with the latter in a net-line contacting mode, the board is preferably in the form of a honeycomb;
- the air-collecting bin 40 is in the form of a trapezoid box, it is hollow with an opened upper side of the size in correspondence with that of the platform 30 to abut on and connect with the latter, and is provided on the rear side thereof with an air outlet 41, pivotally connecting members 43 are provided above the outlet 41 on this side to pivotally connect the platform 30; and the air-collecting bin 40 is provided on another side thereof with a locking mechanism 44 in opposition to the platform 30, so that it can be opened downwardly or closed for the convenience of collecting the dropped material from the work piece 60 and clearing the wastes and crumbs generated in processing; in practicing, the locking mechanism 44 is provided with a plurality of locking holes 441 and locking bolts 442 for connecting the air-collecting bin 40 with the platform 30; the pivotally connecting members 43 are hinges;
- the base 50 has a hole 51 on one side thereon in corresponding to that of the air-collecting bin 40 with the air outlet 41, so that an airdrawing and dust-collecting device 42 can be connected with the air outlet 41 of the air-collecting bin 40, while a side in opposition to this side with the hole 51 is provided with a movable door 52 for the convenience of moving the air-collecting bin 40.

Therefore, the air-collecting bin 40 is placed beneath, abutted on and connected to the platform 30 and connected to the inside of the base 50, then the laser-engraving mechanism 20 is connected to the upper side of the base 50, and the panel 10 is abutted on and connected to the base 50 to form the structure of the platform and the air-collecting bin for the laser-cutting/engraving machine.

Figure 5:
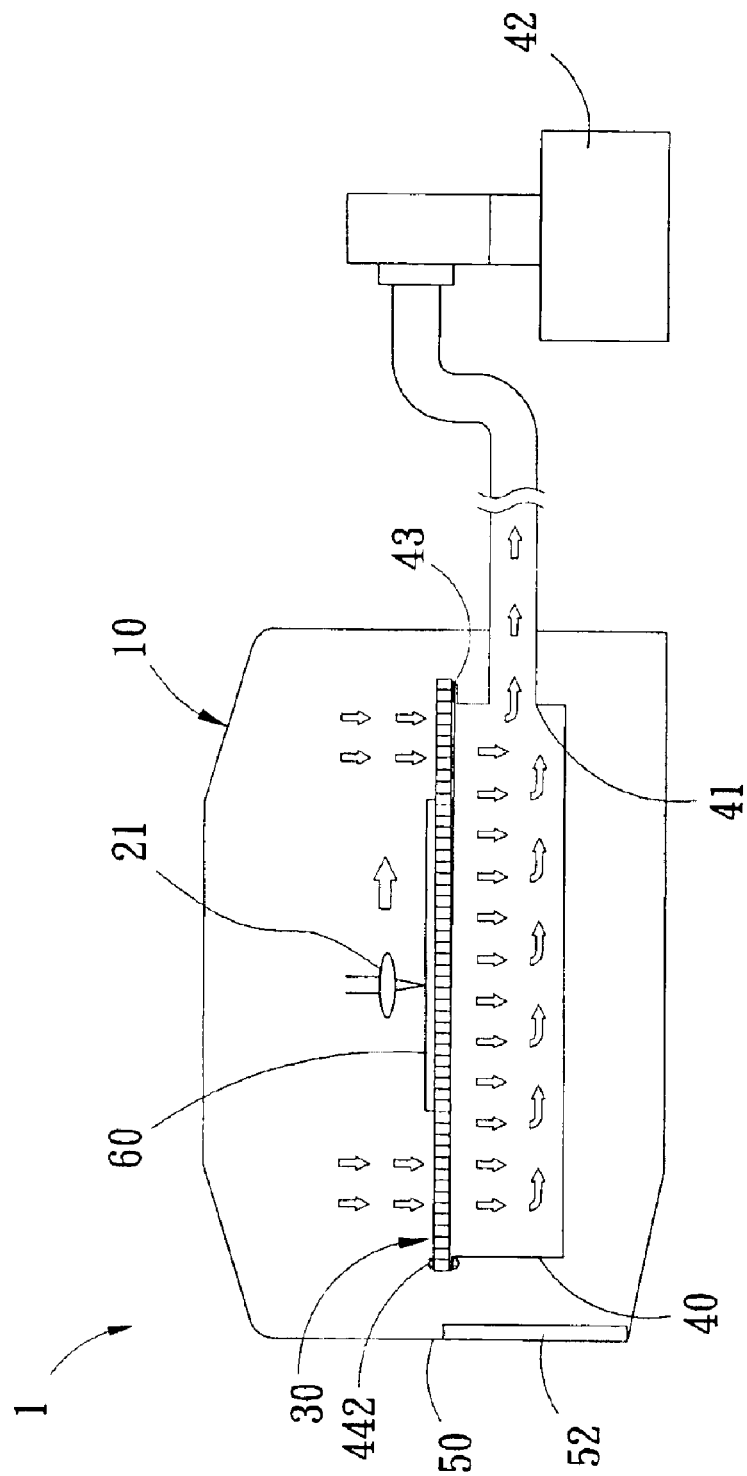
FIG. 5 is a schematic view showing operation of the embodiment of the present invention.

Referring simultaneously to FIGS. 4 and 5, the platform 30 of the present invention is provided with a plurality of upright folded metallic thin-plates 31 folded to form a board with a large area, the folded metallic thin plates 31 therebetween form a plurality of holes 32; so that when the work piece 60 (a piece of cloth or leather) is placed on the platform 30, it contacts with the latter in a net-line contacting mode, and the work piece 60 (the piece of cloth or leather) can be firmly held on the platform 30. When the air-drawing and dust-collecting device 42 is activated, by virtue that air is taken into the panel 10 and discharged out of the air outlet 41 of the air-collecting bin 40, the pressure above the work piece 60 (the piece of cloth or leather) will be larger, this renders the work piece 60 (the piece of cloth or leather) to be fixed on the platform 30 by the pressure; and by virtue that the ignition point of the work piece 60 (the piece of cloth or leather) is lower, so that the work piece 60 is subject to danger of burning by the fact that heat generated in cutting and engraving is unable to scatter. The present invention has the work piece 60 fixed by pressure, when in cutting the work piece 60, air flow will pass through the cutting point at any time to fast remove the heat and crumbs to effectively lower the temperature during cutting, and can extinguish the small flame generated in the crumbs to effectively prevent the work piece 60 from burning.

By the fact that the work piece 60 (the piece of cloth or leather) contacts with the platform 30 in a net-line contacting mode, when in cutting or carving the work piece 60, the crumbs and smoke generated in laser processing can be discharged from the air-collecting bin 40 beneath platform 30 easily and out of the air outlet 41 on the rear of the air-collecting bin 40 to be collected in the air-drawing and dust-collecting device 42 without leaving residuals of crumbs on the platform 30 to form rough edges of the products, neither making incomplete pattern formed by cutting or engraving by accumulating of crumbs on the work piece 60 (the piece of cloth or leather), thereby, better rate of production can be obtained.

Figure 6:
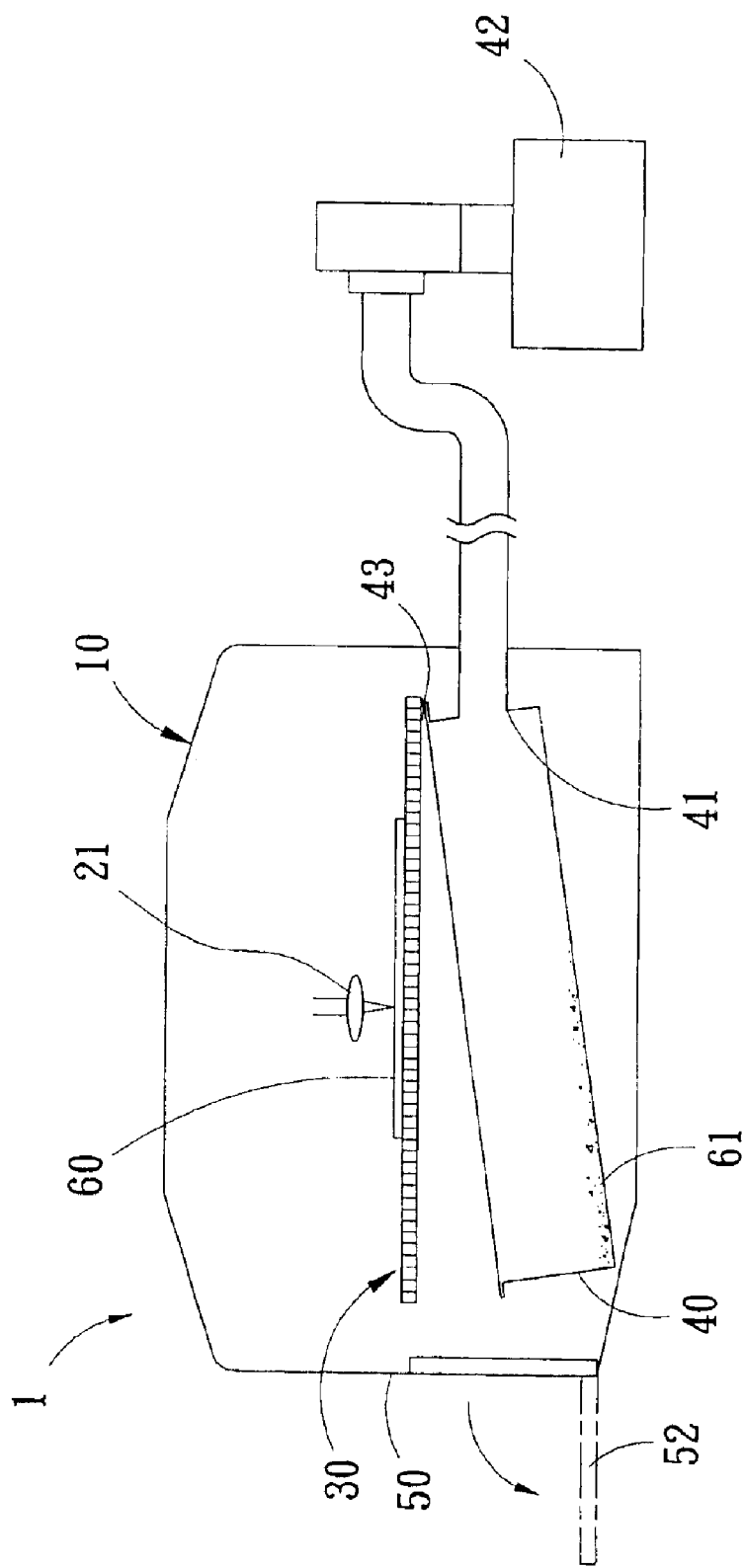
FIG. 6 is a schematic view showing opening downwards of an air-collecting bin of the present invention.

Referring further to FIG. 6, by virtue that the air-collecting bin 40 is in the form of a trapezoid box, and it is pivotally connected on one side thereof, hence is convenient for being opened downwardly for clearing off dusts of wastes 61 generated in processing or for collecting the dropped material from the work piece 60 on the platform 30 when the machine body 1 is under processing of a fine article.

And more, the platform 30 of the present invention is integrally formed of metal, its surface is plane and neat, so that the work piece 60 can be placed evenly thereon to increase the accuracy of cutting or engraving; the platform 30 is formed of metal, it will not be damaged during cutting of the work piece 60 by a laser beam as is the case of a conventional cloth with needles, it can be repeatedly used without changing to effectively reduce the cost of cutting or engraving and hence is industrial valuable.

Therefore, the present invention has the following advantages:

1. In the present invention, the contact surfaces of the platform and a work piece are contacted with each other in a net-line contacting mode, thereby the crumbs and smoke generated in laser processing can be discharged from an air-collecting bin and out of an air outlet on the rear of the air-collecting bin to endue the present invention with an effect of removing crumbs and smoke as well as firmly fixing the work piece.
2. The air-collecting bin of the present invention can be opened downwardly or closed for the convenience of collecting the dropped material of the work piece processed and clearing the wastes and crumbs generated in processing.
3. With the present invention, by fixing a piece of cloth or leather by air pressure, heat and cutting crumbs can be fast removed to effectively reduce the temperature generated in cutting, thereby combustion of the cloth and leather can be prevented.

4. In the present invention, by providing the platform integrally formed of metal, the platform can be repeatedly used, thereby cost of cutting and engraving can be reduced.

In conclusion, according to the description disclosed above, the present invention surely can get the expected object thereof to provide a structure of a platform and an air-collecting bin in a laser-cutting/engraving machine.

Having thus described my invention with practical value, what I claim as new and desire to be secured by Letters Patent of the United States are:

1. In a laser-cutting/engraving machine, a structure of a platform and an air-collecting bin, wherein a panel and a bottom base are mutually abutted on and connected to form the body of said machine, said machine body is provided therein with a laser-engraving mechanism, said platform for a work piece and said air-collecting bin, said air-collecting bin is placed beneath, abutted on and connected to said platform, said laser-engraving mechanism is provided on said platform, said machine body is provided with a movable door for said air-collecting bin; said structure is characterized by that:

said platform for said work piece is composed of a plurality of upright folded thin plates forming a board with a large area, said folded thin plates form therebetween a plurality of holes, so that said work piece is placed on said platform contacting therewith in a net-line contacting mode to enhance removing crumbs and fixing said work piece; and said air-collecting bin is in the form of a trapezoid box, and is provided on a rear side thereof with an air outlet, pivotally connecting members are provided above said outlet on said side to pivotally connect said platform, and is provided on another side thereof with a locking mechanism in opposition to said platform, said air-collecting bin is adapted to opening downwardly or closing for the convenience of collecting dropped materials processed and clearing wastes and crumbs generated in processing.

2. The structure as in claim 1, wherein said upright folded thin plates of said platform are metallic thin plates.

3. The structure as in claim 1, wherein said locking mechanism is provided with a plurality of locking holes and locking bolts for connecting said air-collecting bin with said platform, said pivotally connecting members are hinges in favor of opening of said air-collecting bin.

4. The structure as in claim 1, wherein said holes provided on said platform are of one kind of hexagonal, quadrilateral and round shapes.

5. The structure as in claim 1, wherein said air outlet on said rear side of said air-collecting bin is connected externally to an air-drawing and dust-collecting device via a hole provided correspondingly on said bottom base to enhance fixing said work piece and removing crumbs and smoke as well as heat sinking when in drawing air.

* * * * *